337-173

Search Roo

April 22, 1941.

W. O. SCHULTZ ET AL

REPEATING FUSE CONSTRUCTION

Original Filed Jan. 14, 1935

Re. 21,780

Orig. 2,063,466

3 Sheets-Sheet 1

INVENTORS
William O. Schultz
BY Alvin G. Steinmayer

Arthur R. Woolfolk
ATTORNEY.

200. ELECTRICITY - CIRCUIT
MAKERS & BREAKERS,
1 6

Search Ro

April 22, 1941. W. O. SCHULTZ ET AL Re. 21,780

REPEATING FUSE CONSTRUCTION

Original Filed Jan. 14, 1935 3 Sheets-Sheet 2

INVENTORS
William O. Schultz
BY Alvin G. Steinmayer
Arthur R. Woodfolk
ATTORNEY.

200. ELECTRICITY- CIRCUIT
MAKERS & BREAKERS,
1 26

April 22, 1941. W. O. SCHULTZ ET AL Re. 21,780

REPEATING FUSE CONSTRUCTION

Original Filed Jan. 14, 1935 3 Sheets-Sheet 3

INVENTORS
William O. Schultz
BY Alvin G. Steinmayer
Arthur R. Woodcock
ATTORNEY.

200. ELECTRICITY- CIRCUIT
MAKERS & BREAKERS,
126

Search Roo

Reissued Apr. 22, 1941

Re. 21,780

UNITED STATES PATENT OFFICE 21,780

REPEATING FUSE CONSTRUCTION

William O. Schultz, South Milwaukee, and Alwin G. Steinmayer, Milwaukee, Wis., assignors to Line Material Company, South Milwaukee, Wis., a corporation of Delaware Original No. 2,063,466, dated December 8, 1936, Serial No. 1,696, January 14, 1935. Application for reissue November 8, 1937, Serial No. 173,432

54 Claims. (Cl. 200—126)

This invention relates to a repeating fuse construction and is particularly directed to a construction in which a device is provided which recloses the circuit after the blowing of a fuse and connects a fresh or reserve fuse in the circuit, such device being capable of repeating as many times as the device is designed for.

The advantage of this automatic repeating fuse construction is that the device lends itself to transmission service and customer's substation service. Frequently in these services short-circuits occur due to any one of many causes, such as a tree falling across a pair of lines, a pair of lines being whipped together by a wind, a flashover, a temporary ground, or the branch of a tree which in a violent wind may be blown against the line. Under these and similar conditions it frequently happens that the trouble is only temporary and that it either ceases of itself or the fault is burned out almost immediately.

This invention is designed to provide a device which will take care of conditions such as outlined above, which will electrically disconnect the blown fuse from the line, and after a predetermined brief interval immediately connect a reserve or fresh fuse in the line, such device providing for the successive operation of as many fuses as the device is equipped to handle, and to provide a device of this type in which the time delay interval is obtained by an automatic time delay device.

This invention provides for the renewal of a blow fuse without interrupting the service, and objects of this invention are to provide a construction which permits the ready removal and refusing of the blown fuse, which permits the ready restoring of such refused fuse, and the automatic disconnecting of the next adjacent auxiliary or reserve fuse without at any time interrupting the circuit during this restoring operation.

Further objects of this invention are to provide a housed type of drop-out repeating fuse construction in which as many housed types of fuses may be related as required for the given number of repetitions elected, and in which although each fuse is housed, nevertheless it drops or moves out of position after blowing and projects from its particular housing, thus giving a visual indication of the particular fuse that has blown.

Further objects of this invention are to provide a construction in which no fuse has to be first mechanically moved into place before it is ready to operate upon the blowing of a preceding or first fuse, in which the auxiliary or reserve fuses although mechanically in place are nevertheless automatically electrically connected in service in succession as the preceding fuse or fuses blow.

Further objects are to provide a housed type of repeating fuse construction in which each fuse unit is guided for sliding motion downwardly away from the stationary contact carried by the housing, in which this downward sliding motion is restrained by the fuse link, in which means are provided for biasing the tube towards its downward motion, in addition to the biasing effected by gravity, to insure positive action of the fuse unit, and in which means are provided to facilitate the quick withdrawal of any remaining portion of the fuse link after the fuse link has blown to thereby secure a quick breaking of the circuit within the fuse tube.

Further objects are to provide a construction in which repeating housed type of multiple fuses are provided in such a manner that each fuse unit is carried by the door of its housing and in which the door may be pulled outwardly and thereby may remove the fuse from the circuit, automatic switch mechanism reestablishing the circuit through the next succeeding fuse unit.

Further objects are to provide a construction in which a blown fuse or fuses may be readily removed, refused, and replaced and when rocked into position, will automatically disconnect the succeeding fuse.

Further objects are to provide a drop-out fuse construction of the repeating fuse type in which the several fuse units are so made that positive contact is maintained between the stationary contact of the housing and the contact carried by the fuse tube, which ultimately moves away from the stationary contact, such positive contact being maintained for an appreciable interval of time to insure complete clearing of the fuse tube prior to the breaking of the contact between one of the fuse tube contacts and one of the contacts carried by the housing, thus guarding against any possibility of arcing at this point.

Further objects are to provide a repeating fuse construction of the housed type in which after a fuse blows and moves to circuit open position, nevertheless the door for its housing remains closed and thus protects the interior thereof from the weather, and to provide a construction in which the switch for connecting the successive fuse unit is housed and located at a point remote from the open end of the expulsion type of fuse employed in the device so that not only is the switch protected from weather at all times but additionally is protected from any possibility of the fuse link whipping into contact with any of the switch parts.

Embodiments of the invention are shown in the acocmpanying drawings, in which.

Figure 1:
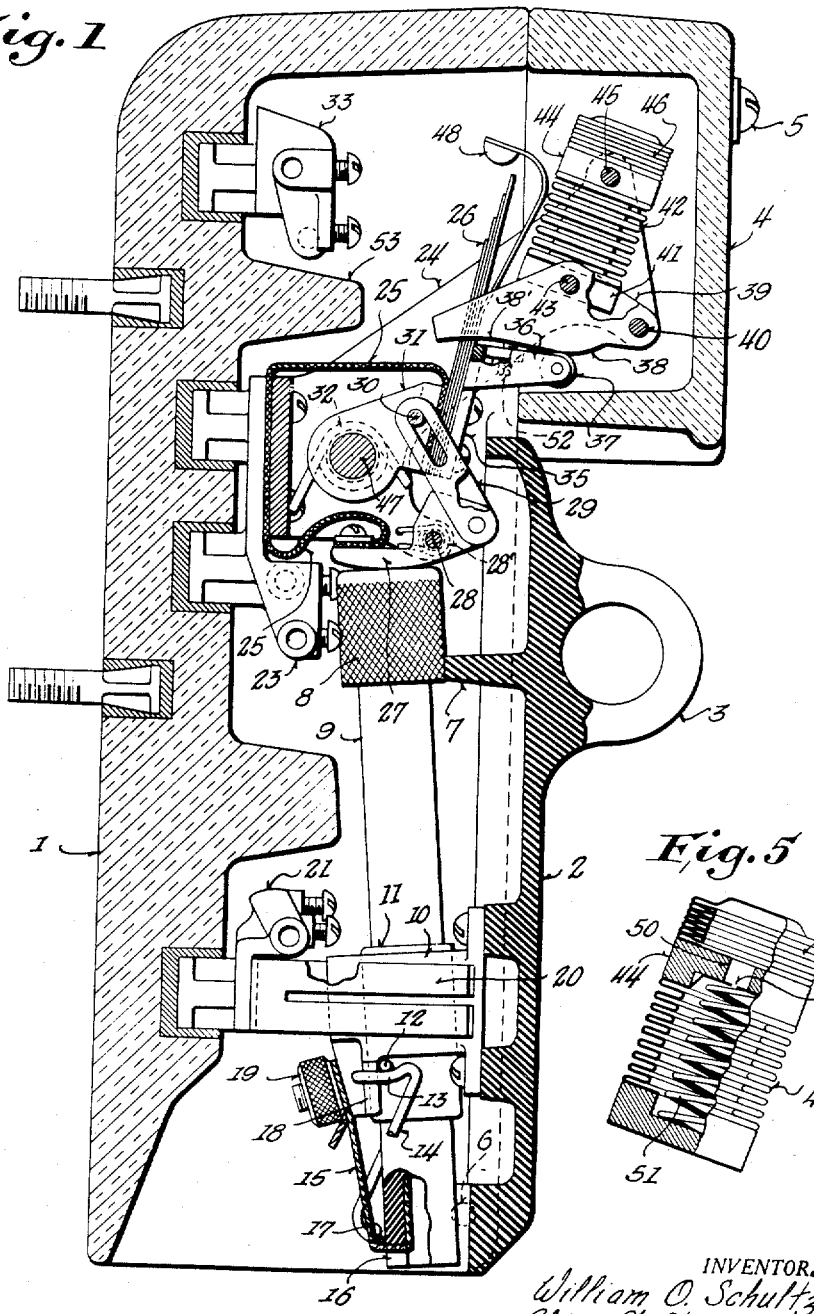
Figure 1 is a vertical sectional view through one form of the invention showing one of the fuse units.
Figure 2:
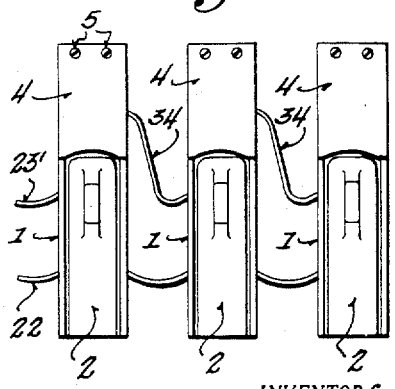
Figure 2 is a view showing a series of fuse units as they appear when connected together and in operative relation.

Referring to the drawings, particularly Figures 1 and 2, it will be seen that the device comprises a plurality of housings 1 which are provided with doors 2 equipped with manipulating members or eyelets 3 and with removable upper covers 4 for the automatic connecting switch and timing mechanism hereinafter described, such covers being removably held in place in any suitable manner as by means of the screws 5. If desired, the door 2 may be hinged as indicated at 6 and may be either permanently hinged to the casing or removable therefrom as desired.

If desired, the door may be formed of a phenolic condensation product and the casing and cover may, if desired, be formed of the same or other insulating material. It is preferable, however, to form the casing 1 or body portion and the upper cover 4 of porcelain.

The door is provided with an upper transverse stop web 7 against which the upper contact 8 of the fuse tube 9 normally bears. The lower portion of the door may carry a stationary contact 10 which in reality is a sleeve and slidably receives the metallic sleeve 11 rigidly carried by the fuse tube 9. The sleeve 11 has projecting pins 12 projecting from opposite sides thereof which are normally held against downward motion by means of the shoulder portion or heel portion 13 of a fuse link retracting and restrained spring member 14.

The member 14 tends to swing in a clockwise direction and is restrained from such swinging motion by means of the fuse link 15 which passes outwardly through the open lower end of the fuse tube 9 and may pass through a slot 16, see Figure 1, and over the connecting or bail portion 17 of the spring urged member 14. In reality, the member 14 has the arms or heel-like portions 13 riding over a downwardly tapered web 18 formed integrally with the stationary contact 10 carried by the door, though the particular mode of imparting a yielding retracting urge to the member 14 is immaterial. (The member 14 is shown partly in section and broken away in Figure 1.)

However, it is to be noted that the member 14 is pivoted to the stationary contact 10 and that the stationary contact 10 carries a thumb nut 19 which clamps the free end of the fuse link 15, the fuse link, of course, extending from the upper contact 8 of the fuse tube in the usual manner.

The stationary lower contact of the housing includes spring pressed fingers 20 which receive between them and frictionally grip the contact 10 carried by the door and thus serve additionally to releasably retain the door in closed position. The door, however, may be pulled open, thus taking the fuse tube 9 with it when desired. The spring fingers 20 are carried by a terminal member 21 which is adapted to receive the incoming conductor 22, see Figure 2.

The upper contact member includes the terminal member 23, see Figure 1, to which the incoming upper conductor 23' is attached. This upper contact also carries a pair of outwardly extending arms 24 for supporting portions of the timing mechanism and switch structure hereinafter described. It also carries a flexible leader 25 which connects the switch blade 26 with the upper contact and also connects the downwardly pressed contact member 27 hereinafter described with the stationary upper contact so as to insure good electrical connection between the several parts.

It will be seen from the description thus far given that the fuse tube 9 is freely slidable downwardly through the stationary contact 10 carried by the door but is restrained from such sliding motion by means of the fuse link. Obviously when the fuse link ruptures, the fuse tube is released and freely slides downwardly, thus widely separating the upper contact 8 of the fuse tube from the upper contact portion or member 27 of the housing.

The member 27 is in reality a lever and is pivoted, as indicated at 28, between the arms or side plates 24. The lever or contact member 27 is spring urged downwardly by means of the spring 28' and thus presses firmly against the upper contact 8 of the fuse tube and urges the fuse tube downwardly.

This rocking tendency for the lever 27 is also imparted thereto by means of slotted links 29 pivoted at their lower ends to the lever 27 and receiving pins 30 in their slotted portions. The pins 30 are carried by the switch carrying lever or switch lever 31 which is pivotally mounted between the members 24 and is urged by means of the spring 32 in a counterclockwise direction and inasmuch as the lever 31 carries the movable arm 26 of the switch, it is obvious that the switch is biased or urged towards switch closed position.

The stationary contact for the switch is indicated at 33 in Figure 1 and receives the upper connector 34, see Figure 2, which extends to the next succeeding fuse and, of course, would be connected to the terminal member 23 thereof, see Figure 1, as was described in connection with Figure 1. The successive fuses are, of course, similarly connected and as many as desired may constitute the entire unit depending on how many automatic operations are desired.

It is apparent, therefore, that under normal conditions before any of the fuses have blown that the line is connected through the first fuse from the terminal member 23 to the lower terminal member 21, see Figure 1.

The movable switch blade 26 is preferably of laminated structure and is clamped between the front face of the lever 31 and a plate 35. The plate 35 has an outwardly projecting pair of arms 36 which carry between them a roller 37 which rides on the cam face 38 of a channel-shaped lever 39.

This lever 39 is pivoted, as indicated at 40, between the plates 24 and pivotally carries the head 41 of a metal bellows 42, the head 41 of such member being provided with trunnion pins 43 which are received by the lever 39. The bellows member or delay device is provided with an intermediate portion 44 which is pivoted by means

200. ELECTRICITY: CIRCUIT MAKERS & BREAKERS.
126

Search Ro of the trunnion pins 45 between the arms 24. A storage bellows 46 is also carried by the member 44.

It is to be noted that the cam face 38 of the cam lever is curved and provides a straighter portion concaved downwardly, as indicated at 38'. The purpose of the peculiar shaping of the cam lever is to retard the upward rocking motion of the roller 37, as this roller rocks about the center of the pivot pin 47 which supports the main lever 31. However, when the roller travels on the portion 38', it does not have to press the lever 39 upwardly any farther and thus the movable switch arm 26 makes a final quick closing motion, though the early and major portion of its closing motion is slow.

If desired, the switch arm 26 may be supplemented by an arc finger 48 which leaves the stationary contact 33 after the arm 26 has broken contact with such stationary contact 33.

Figure 5:
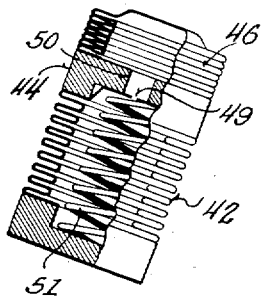
Figure 5 is a fragmentary sectional view showing the timing element.

The construction of the metal bellows delay device will be better understood from Figure 5. It will be seen that the bellows 42 communicates with the bellows 46 by means of a small opening 49 preferably formed in a continuation of the bellows 42 for simplicity of manufacture.

It will be seen also that the head 44 is provided with a relatively large opening 50 so that the actual retarding opening is the opening 49. The bellows 42 is provided with a restoring spring 51 so that when pressure is removed from the lever 39, see Figure 1, the bellows 42 will assume its initial shape and draw the oil or other fluid from the storage bellows 46.

If desired, an adjusting screw 52, see Figure 1, may be provided and carried by the lever 36 and is adapted to engage the lever 39 when the parts are in the position shown in Figure 1 to thus prevent the bellows 42 from expanding to its full extent if this shorter time is desired. Obviously, if the bellows 42 is not fully extended, the amount of movement of the bellows 42 before release of the switch arm 26 occurs is less.

The operation of the apparatus is as follows: When the overload occurs and the fuse link 15 is severed, it is obvious that it is expelled from the fuse tube under normal conditions, but if for any reason, as, for example, a very small and gradually applied overload should occur and a small remaining portion of the fuse link 15 exists, it is obvious that the spring member 14 will retract such remaining portion of the fuse link from the fuse tube.

At all events, the pins 12 are released as the member 14 rocks out of the way of such pins and the fuse tube slides downwardly. This downward motion of the fuse tube is aided by the pressure exerted by the contact member 27 which is spring urged downwardly as described.

It also is to be noted that contact is maintained for an interval between the member 27 and the upper contact 8 of the fuse tube, thus insuring clearing of the fuse tube prior to separation of the contact 8 from the member 27. The slots in the links 29 permit the lever 27 to freely follow the contact 8 downwardly though the lever 31, which carries the switch arm 26, is at this instant being retarded by the slow motion or time delay mechanism.

However, when the fuse tube moves downwardly, it is obvious that the switch arm 26 is released and starts towards closed position, the roller 37 riding on the end face of the cam member 39 and compressing the bellows 44. The switch arm 26 moves towards closed position and as it approaches the final portion of the closing stroke, the sudden release, due to the cam construction hereinbefore described, occurs and the switch closes with a snap action, thus connecting the next succeeding fuse unit in the circuit.

When the door is pulled open, it is obvious that the device may be refused and the door may thereafter be rocked to closed position. The lever 27 is now in the way of the upper contact 8. As the door is forced towards closed position, the lever 27 is rocked back to the position shown in Figure 1 and the parts again assume their position, as shown in such figure, thus opening the circuit to the next succeeding fuse unit and allowing the refused fuse unit to now carry the load. The arcing contact finger 48 is the last to leave the contact 33, see Figure 1.

If desired, an insulating barrier 53 may be formed integral with the body portion 1 and may be interposed between the upper switch contact 33 and the fuse unit.

It is to be noted that the opening and closing of the door 2 does not open up the upper portion of the housing. However, it is apparent that the upper portion of the housing may be opened if it is desired to inspect the timing mechanism or the switch contacts.

Figure 3:
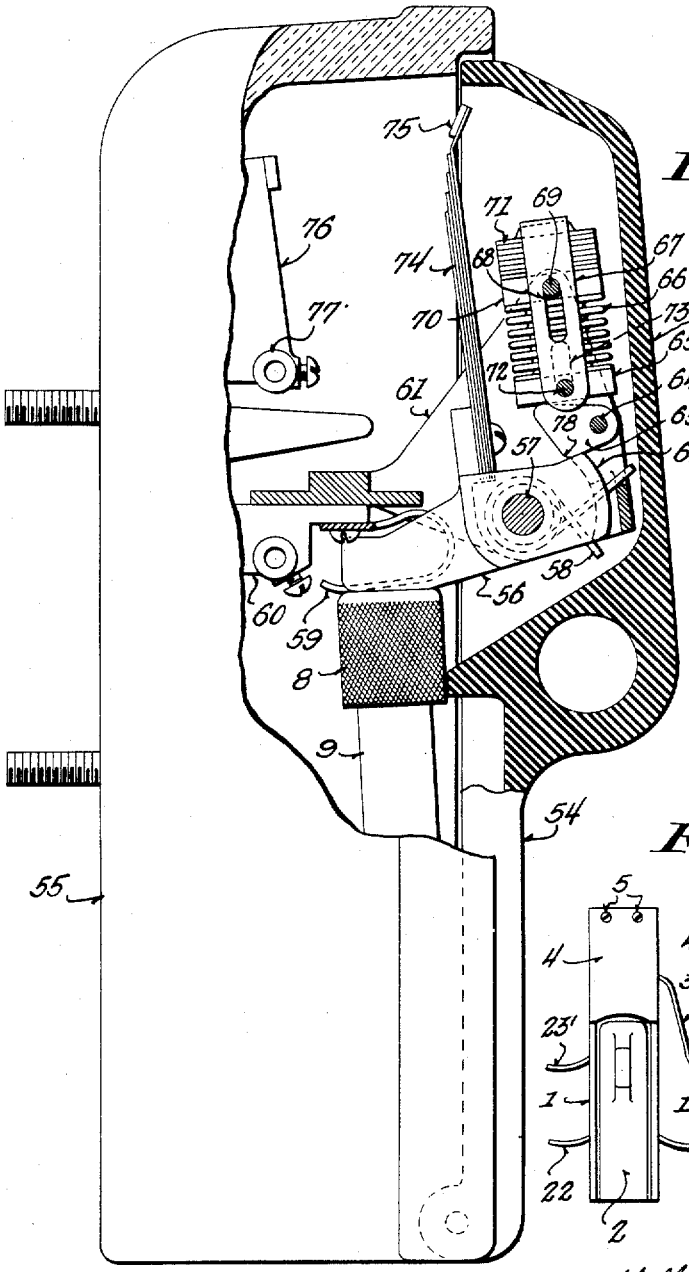
Figure 3 is a view partly broken away and in section showing a further form of the invention.

The invention may take other forms, for instance as shown in Figure 3. The door 54 may be hinged to the body portion 55 and may have an extension 54' which constitutes the housing for the timing mechanism and the connecting switch.

Also in this form of the invention the fuse tube 9 has its upper contact 8 in engagement with a lever 56 pivoted at 57 and urged by the spring 58 in a counterclockwise direction. Additionally, a relatively strong spring 59 is carried by the upper stationary contact 60 and bears against the upper contact 8 of the fuse tube and biases the fuse tube downwardly. The spring 59, as indicated in Figure 3, may be bifurcated so that the arms thereof are located on opposite sides of the projecting tongue of the lever 56.

It is to be noted also that similarly to Figure 1, the upper contact 60 carries a pair of side plates 61 between which the lever 56 is pivoted. The lever 56 is provided with a projecting portion having an outer rounded face 62. The projecting portion bears against a small cam-like lever 63 pivoted as indicated at 64 and contacting with the head 65 of the bellows 66.

The head 65 of the bellows has secured thereto a pair of links located on opposite sides and indicated by the reference character 67. These links may be integral if desired and at all events are provided with slotted portions 68 which are guided by the pivot pins 69 projecting from opposite portions of the intermediate head 70 of the bellows and pivoted to the side plates 61. The storage bellows is indicated by the reference character 71.

A convenient way of guiding the head 65 is to provide such head with pins 72 extending from opposite sides thereof and guided in slots 73 formed in the side plates 61. The lever 56 is provided with a projecting portion to which the movable contact arm 74 is secured. Additionally, an arc finger 75 may be provided if desired. The movable switch contact is adapted to engage the upper stationary contact 76 which is provided with the conductor receiving portion 77.

The operation of this device is substantially similar to that previously described. When the fuse blows, it is urged downwardly by the spring 59 and by the lever 56. However, the motion of the lever 56, and consequently of the movable switch blade, is retarded by the timing device or time delay device. The projecting portion of the lever 56 rocks the lever 63 and consequently compresses the bellows 66. However, after the rounded portion 62 of the lever passes the point 78 of the cam lever 63, it is obvious that the switch 74 will make a quick closing stroke, the major portion of the closing stroke, however, being retarded by the time delay device as described.

Figure 4:
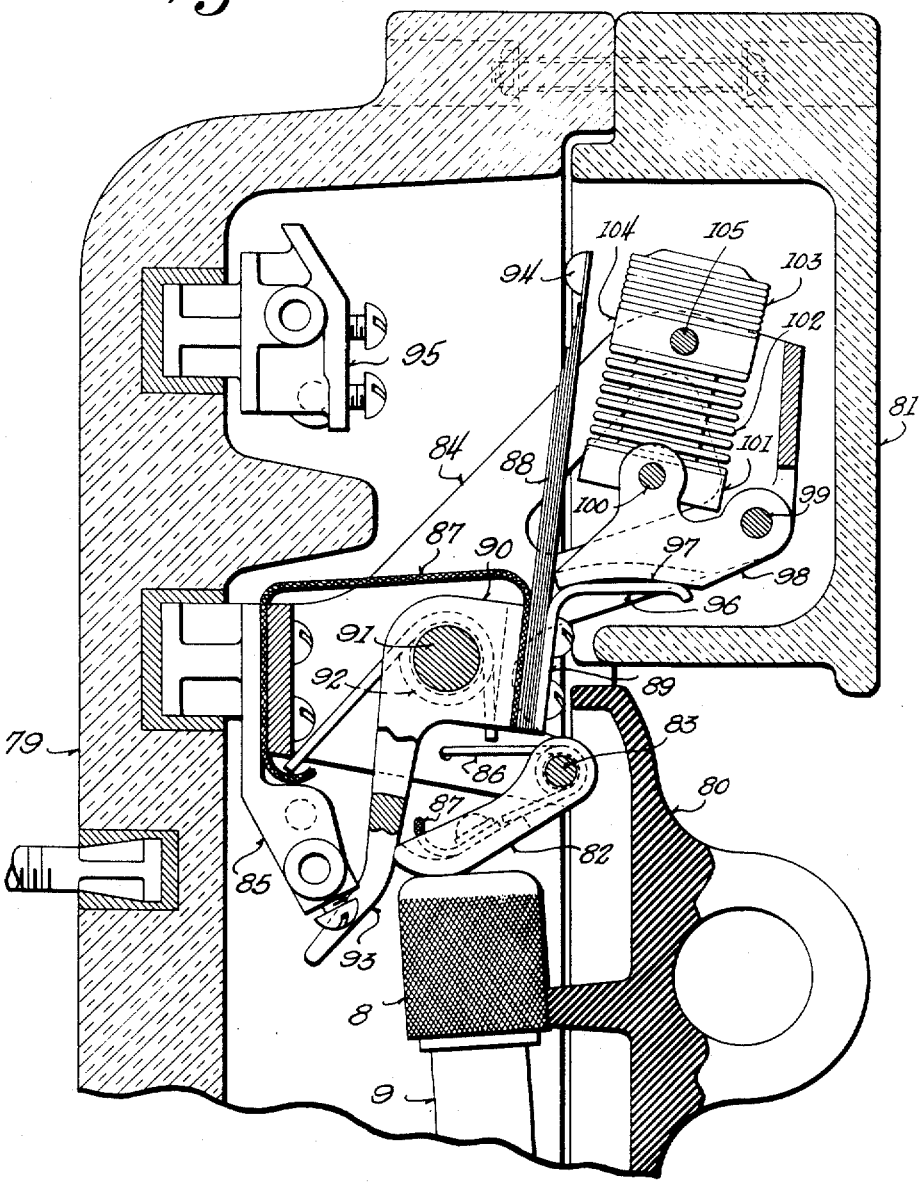
Figure 4 is a fragmentary enlarged view of the upper portion of a fuse unit showing a still further form of the invention.

In the form of the invention shown in Figure 4, the body portion is indicated by the reference character 79, the door by the reference character 80, and the removable cover for the connecting switch and timing mechanism by the reference character 81. However, it is to be distinctly undestood that in any form of the invention the door and the cover for the upper portion of the apparatus may be either formed as an integral member, as shown in Figure 3, or may be shown as separate members, for example as shown in Figures 1 and 4.

The upper contact 8 of the fuse tube 9 is urged downwardly by the contact member or lever 82 pivoted as indicated at 83 between the side plates 84 carried by the upper contact or terminal member 85, the spring for the lever 82 being indicated by the reference character 86. This contact member 82 is connected with the terminal or stationary contact member by means of a flexible leader or conductor 87. This conductor 87 also extends to the movable arm 88 of the connecting switch, such arm being formed of laminated material and being clamped between the member 89 and the main lever 90. The main lever is pivoted as indicated at 91 and is urged in a counterclockwise direction by means of the spring 92. This main lever is bifurcated and is provided with a curved downwardly and rearwardly extending tongue-like portion 93 which bears against the end of the contact lever or member 82 under normal conditions.

It is to be noted that the movable switch arm may be provided with an arc tip or contact 94 and that the movable switch arm 88 is adapted to engage the stationary switch contact 95.

The member 89 is provided with an extending portion 96 bent approximately at right angles thereto and terminating in a rounded end as shown. This member 96, therefore, rigidly travels with the lever 90 and may be said to form an extension thereof. It engages the cam face 97 of the cam lever or intermediate lever 98. This intermediate lever is pivoted as indicated at 99 between the side frame plates 84 and is also pivoted as indicated at 100 to the forward head 101 of the bellows time delay device, the active bellows being indicated by the reference character 102 and the storage bellows by the reference character 103. The intermediate portion 104 of the bellows construction is pivoted as indicated as 105 between the side frame plates.

The operation of this apparatus is substantially similar to that previously described. Assuming that the fuse blows, the fuse tube will move downwardly and thereby allow the lever or contact member 82 to follow the upper contact 8 of the fuse downwardly a sufficient distance to insure clearing of the fuse tube before contact is broken between the member 8 and the member 82. Also as the lever or contact member 82 moves downwardly, it is apparent that it releases the lever 90 as the tongue 93 of such lever 90 is now free to rock in a counterclockwise direction.

The arm or cam actuating member 96 rides along the cam face 97 and rocks the lever 98 upwardly, thereby compressing the bellows. Consequently the switch arm 88 executes the first portion of its closing stroke slowly. However, the cam portion 97 is so shaped that the latter part of the closing motion of the switch arm 88 is made very quickly as previously described.

It will be seen that a novel form of housed type of drop-out fuse has been provided by this invention in which a repeating fuse action is obtained. Further it will be seen that the fuse blows and moves out of circuit closing position, that is to say, separates certain of the contacts, as previously described, after the fuse tube has cleared itself. Further than this, the door of each individual housing remains closed even when its fuse has blown and thus protects the mechanism from the action of the weather.

Additionally, it will be seen that a sliding type of housed repeating drop-out fuse has been provided and that the fuse tube is biased towards downward sliding motion. Also it will be noted that the timing mechanism is very reliable in its operation and is of simple construction. This mechanism automatically connects the next adjacent fuse in circuit after a predetermined interval of time has elapsed.

Although this invention has been described in considerable detail, it is to be understood that such description is intended as illustrative rather than limiting, as the invention may be variously embodied and is to be interpreted as claimed.

We claim:

1. A repeating fuse construction comprising a first fuse unit and a second fuse unit, a fuse link in each fuse unit, an electric line normally connected through said first fuse unit, said first fuse unit including a fuse tube for the fuse link mounted to move from operative to inoperative position when said fuse link is ruptured, a normally open automatic switch carried by said first fuse unit and actuated upon movement of said first fuse unit towards inoperative position for connecting said second fuse unit in the electric line upon blowing of said first fuse unit, and a housing for said first fuse unit including a door, said first fuse unit being movable from operative to inoperative position while the door of the housing remains closed.

2. A repeating fuse construction comprising a first fuse unit and a second fuse unit, a fuse link in each fuse unit, an electric line normally connected through said first fuse unit, said first fuse unit including a fuse tube for the fuse link mounted to move from operative position to inoperative position when said fuse link is ruptured, a switch biased towards closed position and normally held in open position by the fuse tube of the first fuse unit, said switch, upon closing, connecting the second fuse unit in the electric line, a housing for said first fuse unit, said housing including a door, and said first fuse unit being movable to inoperative position while the door of the housing remains closed.

3. A repeating fuse construction comprising a plurality of fuse units, the first fuse unit including a housing having a door, a fuse tube mounted within said housing and a fuse link carried within said fuse tube, means for guiding said fuse tube for opening the electric circuit through said first fuse unit by the mechanical motion of said first fuse unit from operative to inoperative

200. ELECTRICITY- CIRCUIT MAKERS & BREAKERS,

Search Roo

126 position independently of any motion of the door, restraining means holding said first fuse unit in place, said restraining means being held by the fuse link of said first fuse unit, and a normally open switch carried by said first fuse unit for establishing connection through said second fuse unit upon blowing of said first fuse unit.

4. A repeating fuse construction comprising a plurality of fuse units, the first fuse unit including a housing having a door, a fuse tube mounted within said housing and a fuse link carried within said fuse tube, means for guiding said fuse tube for opening the electric circuit through said first fuse unit by the mechanical motion of said first fuse unit from operative to inoperative position independently of any motion of the door, restraining means holding said first fuse unit in place, said restraining means being held by the fuse link of said first fuse unit, and a normally open switch carried by said first fuse unit for establishing connection through said second fuse unit upon blowing of said first fuse unit, said switch being carried within the housing of said first fuse unit.

5. A repeating fuse construction comprising a plurality of fuse units, the first fuse unit including a housing having a door, a fuse tube mounted within said housing and a fuse link carried within said fuse tube, means for guiding said fuse tube for opening the electric circuit through said first fuse unit by the mechanical motion of said first fuse unit from operative to inoperative position independently of any motion of the door, restraining means holding said first fuse unit in place, said restraining means being held by the fuse link of said first fuse unit, a normally open switch carried by said first fuse unit for establishing connection through said second fuse unit upon blowing of said first fuse unit, and time delay mechanism controlling the closing of said switch.

6. A repeating fuse construction comprising a plurality of fuse units, the first fuse unit including a housing having a door, a fuse tube mounted within said housing and a fuse link carried within said fuse tube, means for guiding said fuse tube for opening the electric circuit through said first fuse unit by the mechanical motion of said first fuse unit from operative to inoperative position, restraining means holding said first fuse unit in place, said restraining means being held by the fuse link of said first fuse unit, a normally open switch carried by said first fuse unit for establishing connection through said second fuse unit upon blowing of said first fuse unit, and time delay mechanism controlling the closing of said switch, said time delay mechanism and said switch being mounted within the housing of said first fuse unit.

7. A repeating fuse construction comprising a plurality of fuse units, the first fuse unit including a housing having a door, a fuse tube mounted within said housing and a fuse link carried within said fuse tube, means for guiding said fuse tube for opening the electric circuit through said first fuse unit by the mechanical motion of said first fuse unit from operative to inoperative position, restraining means holding said first fuse unit in place, said restraining means being held by the fuse link of said first fuse unit, a normally open switch carried by said first fuse unit for establishing connection through said second fuse unit upon blowing of said first fuse unit, and time delay mechanism controlling the closing of said switch, said time delay mechanism and said switch being mounted within the housing of said first fuse unit and above said first fuse unit.

8. A repeating fuse construction comprising a plurality of fuse units, the first fuse unit including a housing having a door, a fuse tube mounted within said housing and a fuse link carried within said fuse tube, means for guiding said fuse tube for opening the electric circuit through said first fuse unit by the mechanical motion of said first fuse unit from operative to inoperative position independently of any motion of the door, restraining means holding said first fuse unit in place, said restraining means being held by the fuse link of said first fuse unit, a normally open switch carried by said first fuse unit for establishing connection through said second fuse unit upon blowing of said first fuse unit, and time delay mechanism controlling the closing of said switch, said time delay mechanism and said switch being mounted within the housing of said first fuse unit.

9. A repeating fuse construction comprising a plurality of fuse units, the first fuse unit including a housing having a door, a fuse tube mounted within said housing and a fuse link carried within said fuse tube, means for guiding said fuse tube for opening the electric circuit through said first fuse unit by the mechanical motion of said first fuse unit from operative to inoperative position independently of any motion of the door, restraining means holding said first fuse unit in place, said restraining means being held by the fuse link of said first fuse unit, a normally open switch carried by said first fuse unit for establishing connection through said second fuse unit upon blowing of said first fuse unit, and time delay mechanism controlling the closing of said switch, said time delay mechanism and said switch being mounted within the housing of said first fuse unit and above said first fuse unit.

10. A repeating fuse construction comprising a first fuse unit and a second fuse unit, a fuse link in each fuse unit, an electric line normally connected through said first fuse unit, said first fuse unit including a fuse tube for the fuse link mounted to move from operative to inoperative position when said fuse link is ruptured, restraining means holding said first fuse tube in operative position and controlled by the fuse link of said first fuse unit, a switch carried by said first fuse unit for connecting said second fuse unit in the electric line upon blowing of said first fuse unit, and time delay mechanism controlling the closing of said switch, said time delay mechanism including means following said first fuse tube through a portion of its motion from operative to inoperative position and maintaining electrical contact therewith through such portion of the movement of the first fuse tube.

11. A repeating fuse construction comprising a first fuse unit and a second fuse unit, a fuse link in each fuse unit, an electric line normally connected through said first fuse unit, said first fuse unit including a fuse tube for the fuse link mounted to move from operative to inoperative position when said fuse link is ruptured, restraining means holding said first fuse tube in operative position and controlled by the fuse link of said first fuse unit, a switch carried by said first fuse unit for connecting said second fuse unit in the electric line upon blowing of said first fuse unit, and time delay mechanism controlling the closing of said switch, said time delay mechanism including means following said first fuse tube through a portion of its motion from operative to inoperative position and maintaining electrical contact therewith through such portion of the movement of the first fuse tube, said means being normally held in its initial position by the first fuse tube and restraining the closing motion of said switch.

12. A repeating fuse construction comprising a first fuse unit and a second fuse unit, a fuse link in each fuse unit, an electric line normally connected through said first fuse unit, said first fuse unit including a fuse tube for the fuse link mounted to move from operative to inoperative position when said fuse link is ruptured, restraining means holding said first fuse tube in operative position and controlled by the fuse link of said first fuse unit, a switch carried by said first fuse unit for connecting said second fuse unit in the electric line upon blowing of said first fuse unit, and time delay mechanism controlling the closing of said switch, said time delay mechanism including a pivoted lever for following the first fuse tube through a portion of its movement from operative to inoperative position and maintaining electrical contact therewith through such portion of its movement.

13. A repeating fuse construction comprising a first fuse unit and a second fuse unit, a fuse link in each fuse unit, an electric line normally connected through said first fuse unit, said first fuse unit including a fuse tube for the fuse link mounted to move from operative to inoperative position when the fuse link of said first fuse unit is ruptured, restraining means holding said first fuse tube in operative position and controlled by the fuse link of said first fuse unit, a switch carried by said first fuse unit for connecting said second fuse unit in the electric line upon blowing of said first fuse unit, and time delay mechanism controlling the closing of said switch, said time delay mechanism including a pivoted lever for following the first fuse tube through a portion of its movement from operative to inoperative position and maintaining electrical contact therewith through such portion of its movement, said pivoted lever being spring pressed towards the first fuse tube and normally restraining said switch from closing motion.

14. A repeating fuse construction comprising a first fuse unit and a second fuse unit, a fuse link in each fuse unit, an electric line normally connected through said first fuse unit, said first fuse unit including a fuse tube for the fuse link mounted to move from operative to inoperative position when the fuse link of said first fuse unit is ruptured, restraining means holding said first fuse tube in operative position and controlled by the fuse link of said first fuse unit, a switch carried by said first fuse unit for connecting said second fuse unit in the electric line upon blowing of said first fuse unit, and time delay mechanism controlling the closing of said switch, said time delay mechanism including a pivoted lever for following the first fuse tube through a portion of its movement from operative to inoperative position and maintaining electrical contact therewith through such portion of its movement, said pivoted lever being spring pressed towards the first fuse tube and normally restraining said switch from closing motion and being independently movable towards said first fuse tube without imparting motion to said switch.

15. A repeating fuse construction comprising a first fuse unit and a second fuse unit, a fuse link in each fuse unit, an electric line normally connected through said first fuse unit, said first fuse unit including a fuse tube for the fuse link having an upper contact, a housing for said first fuse unit including a door, guiding means carried by said door for slidably guiding the fuse tube downwardly while said door remains closed, means restraining the downward motion of said fuse tube and controlled by the fuse link of said first fuse unit, a switch mounted in the upper portion of said housing above said fuse tube and including a stationary contact and a movable switch arm adapted to engage said stationary contact and biased towards switch closed position, time delay mechanism for controlling the closing motion of said switch, said switch when in closed position connecting said second fuse unit in the electric line, and a spring pressed metal lever bearing against the upper contact of the first fuse tube and urging said first fuse tube downwardly and establishing electrical contact with the upper contact of said first fuse tube, said lever normally restraining said switch from closing motion and releasing said switch when said first fuse tube has blown and moves downwardly.

16. A repeating fuse construction comprising a first fuse unit and a second fuse unit, a fuse link in each fuse unit, an electric line normally connected through said first fuse unit, said first fuse unit including a fuse tube for the fuse link having an upper contact, a housing for said first fuse unit including a door, guiding means carried by said door for slidably guiding the fuse tube downwardly while said door remains closed, means restraining the downward motion of said fuse tube and controlled by the fuse link of said first fuse unit, a switch mounted in the upper portion of said housing above said fuse tube and including a stationary contact and a movable switch arm adapted to engage said stationary contact and biased towards switch closed position, time delay mechanism for controlling the closing motion of said switch, said switch when in closed position connecting said second fuse unit in the electric line, a spring pressed metal lever urging said first fuse tube downwardly and establishing electrical contact with the upper contact of said first fuse tube, and a slotted link operatively connecting said metal lever and said movable switch arm and normally restraining said movable switch arm from closing motion.

17. A repeating fuse construction comprising a first fuse unit and a second fuse unit, a fuse link in each fuse unit, an electric line normally connected through said first fuse unit, said first fuse unit including a fuse tube for the fuse link mounted to move from operative to inoperative position when the fuse link of said first fuse unit is ruptured, a switch carried by said first fuse unit for connecting said second fuse unit in the electric line upon blowing of said first fuse unit, time delay mechanism for delaying the closing motion of said switch and including a main bellows adapted to contain a fluid and a storage bellows communicating therewith by a restricted orifice and into which said fluid is adapted to be forced upon the closing motion of said switch, and a housing for said first fuse unit including a door, said first fuse unit being movable from operative to inoperative position while the door of the housing remains closed.

18. A repeating fuse construction comprising a first fuse unit and a second fuse unit, a fuse link in each fuse unit, an electric line normally connected through said first fuse unit, said first fuse unit including a fuse tube for the fuse link mounted to move from operative position to inoperative position when the fuse link of said

200. ELECTRICITY - CIRCUIT MAKERS & BREAKERS,
126

Search Ro first fuse unit is ruptured, a switch biased towards closed position and normally held in open position by the fuse tube of the first fuse unit, said switch, upon closing, connecting the second fuse unit in the electric line, time delay mechanism for delaying the closing motion of said switch and including a main bellows adapted to contain a fluid and a storage bellows communicating therewith by a restricted orifice and into which said fluid is adapted to be forced upon the closing motion of said switch, a housing for said first fuse unit, said housing including a door, and said first fuse unit being movable to inoperative position while the door of the housing remains closed.

19. A repeating fuse construction comprising a first fuse unit and a second fuse unit, an electric line normally connected through said first fuse unit, said first fuse unit having stationary contacts and a fuse tube having spaced contacts, a fuse link electrically connecting said spaced contacts, casing means enclosing at least said first fuse unit, guiding means slidably holding said fuse tube with the spaced contacts in engagement with said stationary contacts, means controlled by said fuse link for normally holding said fuse tube against sliding motion, and switch means controlled by the position of said first fuse unit for connecting the electric line through said second fuse unit when said first fuse unit has blown.

20. A repeating fuse construction comprising a first fuse unit and a second fuse unit, an electric line normally connected through said first fuse unit, said first fuse unit having stationary contacts and a fuse tube having spaced contacts, a fuse link electrically connecting said spaced contacts, casing means enclosing at least said first fuse unit, guiding means slidably holding said fuse tube with the spaced contacts in engagement with said stationary contacts, means controlled by said fuse link for normally holding said fuse tube against sliding motion, switch means controlled by the position of said first fuse unit for connecting the electric line through said second fuse unit when said first fuse unit has blown, and time delay means controlling the closing of said switch.

21. A repeating electrical device comprising a first cut-out and a second cut-out, an electric line normally connected through said first cut-out, said first cut-out having stationary contacts and a fuse tube having spaced contacts, a fuse link electrically connecting said spaced contacts, casing means enclosing at least said first cut-out, guiding means slidably holding said fuse tube with the spaced contacts in engagement with said stationary contacts, means controlled by said fuse link for normally holding said fuse tube against sliding motion, and switch means controlled by the position of said fuse tube for connecting the electric line through said second cut-out when said first cut-out has blown.

22. A repeating electrical device comprising a first cut-out and a second cut-out, an electric line normally connected through said first cut-out, said first cut-out having stationary contacts and a fuse tube having spaced contacts, a fuse link electrically connecting said spaced contacts, casing means enclosing at least said first cut-out, guiding means slidably holding said fuse tube with the spaced contacts in engagement with said stationary contacts, means controlled by said fuse link for normally holding said fuse tube against sliding motion, and switch means controlled by the position of said fuse tube for connecting the electric line through said second cut-out when said first cut-out has blown, said fuse tube moving longitudinally when said fuse tube moves from operative to inoperative position and being movable laterally when said fuse tube is moved back into operative position.

23. A repeating electrical device comprising a first cut-out and a second cut-out, an electric line normally connected through said first cut-out, said first cut-out having stationary contacts and a fuse tube having spaced contacts, a fuse link electrically connecting said spaced contacts, casing means enclosing at least said first cut-out, guiding means slidably holding said fuse tube with the spaced contacts in engagement with said stationary contacts, means controlled by said fuse link for normally holding said fuse tube against sliding motion, switch means controlled by the position of said fuse tube for connecting the electric line through said second cut-out when said first cut-out has blown, and time delay means controlling the closing of said switch means.

24. A repeating electrical device comprising a first cut-out and a second cut-out, an electric line normally connected through said first cut-out, said first cut-out having stationary contacts and a fuse tube having spaced contacts, a fuse link electrically connecting said spaced contacts, casing means enclosing at least said first cut-out, guiding means slidably holding said fuse tube with the spaced contacts in engagement with said stationary contacts, means controlled by said fuse link for normally holding said fuse tube against sliding motion, switch means controlled by the position of said fuse tube for connecting the electric line through said second cut-out when said first cut-out has blown, and time delay means controlling the closing of said switch means, said fuse tube moving longitudinally when said fuse tube moves from operative to inoperative position and being movable laterally when said fuse tube is moved back into operative position.

25. A repeating fuse construction comprising a first fuse unit and a second fuse unit, said first fuse unit having a casing provided with stationary contacts, a fuse tube having spaced contacts, a fuse link electrically joining said spaced contacts, said casing having a door, guiding means carried by said door and slidably guiding said fuse tube, means controlled by said fuse link for normally restraining the sliding motion of said fuse tube and holding said spaced contacts in engagement with said stationary contacts, said casing having an open lower portion, said fuse tube being slidable towards said open lower portion while said door remains closed, an electric line normally connected through said first fuse unit, and switch means controlled by the position of the fuse tube of said fuse unit for connecting the electric line through said second fuse unit when said first fuse unit has blown.

26. A repeating fuse construction comprising a first fuse unit and a second fuse unit, an electric line normally connected through said first fuse unit, said first fuse unit having stationary contacts and a fuse tube having spaced contacts, a fuse link electrically connecting said spaced contacts, casing means enclosing at least said first fuse unit, guiding means slidably holding said fuse tube with the spaced contacts in engagement with said stationary contacts, means controlled by said fuse link for normally holding said fuse tube against sliding motion, switch means controlled by the position of said first fuse unit for connecting the electric line through said second fuse unit when said first fuse unit has blown, and time delay means controlling the closing of said switch, said time delay means delaying the initial closing motion of said switch after said switch has started to close.

27. A repeating electrical device comprising a first cut-out and a second cut-out, an electric line normally connected through said first cut-out, said first cut-out having stationary contacts and a fuse tube having spaced contacts, a fuse link electrically connecting said spaced contacts, casing means enclosing at least said first cut-out, guiding means slidably holding said fuse tube with the spaced contacts in engagement with said stationary contacts, means controlled by said fuse link for normally holding said fuse tube against sliding motion, switch means controlled by the position of said fuse tube for connecting the electric line through said second cut-out when said first cut-out has blown, and time delay means controlling the closing of said switch means, said time delay means delaying the initial closing motion of said switch after said switch has started to close.

28. A repeating electrical device comprising a first cut-out and a second cut-out, an electric line normally connected through said first cut-out, said first cut-out having stationary contacts and a fuse tube having spaced contacts, a fuse link electrically connecting said spaced contacts, casing means enclosing at least said first cut-out, guiding means slidably holding said fuse tube with the spaced contacts in engagement with said stationary contacts, means controlled by said fuse link for normally holding said fuse tube against sliding motion, switch means controlled by the position of said fuse tube for connecting the electric line through said second cut-out when said first cut-out has blown, and time delay means controlling the closing of said switch means, said fuse tube moving longitudinally when said fuse tube moves from operative to inoperative position and being movable laterally when said fuse tube is moved back into operative position, said time delay means delaying the initial closing motion of said switch after said switch has started to close.

29. In a device of the class described, a fuse unit including a housing having a pair of input terminal members and a pair of output terminal members, said housing having a door, a fuse tube mounted within said housing and carried by said door and a fuse link carried within said fuse tube, means for guiding said fuse tube for opening the electric circuit through said fuse unit by the mechanical motion of said fuse unit from operative to inoperative position, restraining means holding said fuse unit in place, said restraining means being held by the fuse link of said fuse unit, and a normally open switch carried by said fuse unit for establishing connection from one of said input terminal members to one of said output terminal members upon blowing of said fuse unit.

30. In a device of the class described, a fuse unit including a housing having a pair of input terminal members and a pair of output terminal members, said housing having a door, a fuse tube mounted within said housing and a fuse link carried within said fuse tube, means for guiding said fuse tube for opening the electric circuit through said fuse unit by the mechanical motion of said fuse unit from operative to inoperative position, restraining means holding said fuse unit in place, said restraining means being held by the fuse link of said fuse unit, a normally open switch carried by said fuse unit for establishing connection from one of said input terminal members to one of said output terminal members upon blowing of said fuse unit, and time delay mechanism controlling the closing of said switch.

31. A repeating automatic circuit interrupting switch structure comprising a first interrupting switch and a second interrupting switch, an electrical line normally connected through said first interrupting switch, said first interrupting switch having stationary contacts and an arcing tube open at its lower end and having spaced contacts, an expulsible conductor in said tube connecting said spaced contacts and releasably held therein, casing means enclosing said first interrupting switch, guiding means slidably holding said tube with the spaced contacts in engagement with said stationary contacts, latching means normally holding said tube against sliding motion, means operable on overload in said circuit to release said conductor and said latching means, and circuit closing switch means controlled by the position of the first interrupting switch for connecting said electrical line through said second interrupting switch when said tube has moved to open circuit position.

32. A repeating automatic circuit interrupting switch structure comprising a first interrupting switch and a second interrupting switch, an electrical line normally connected through said first interrupting switch, said interrupting switch having stationary contacts and an arcing tube having spaced contacts, an expulsible conductor electrically connecting said spaced contacts, guiding means slidably holding said tube with the spaced contacts in engagement with said stationary contacts, latch means responsive to an overload in said circuit normally holding said tube against sliding motion, and a circuit closing switch controlled by the first interrupting switch for connecting the electrical line through said second interrupting switch when the first interrupting switch has interrupted said circuit.

33. A repeating automatic circuit interrupting switch structure comprising a first interrupting switch and a second interrupting switch, an electrical line normally connected through said first interrupting switch, said interrupting switch having stationary contacts and an arcing tube having spaced contacts, an expulsible conductor electrically connecting said spaced contacts, guiding means slidably holding said tube with the spaced contacts in engagement with said stationary contacts, latch means responsive to an overload in said circuit normally holding said tube against sliding motion, a circuit closing switch controlled by the first interrupting switch for connecting the electrical line through said second interrupting switch when the first interrupting switch has interrupted said circuit, and time delay means controlling the closing of said circuit closing switch.

34. A repeating automatic circuit interrupting switch structure comprising a first interrupting switch and a second interrupting switch, an electrical line normally connected through said first interrupting switch, said interrupting switch having stationary contacts and an arcing tube having spaced contacts, an expulsible conductor electrically connecting said spaced contacts, guiding means slidably holding said tube with the spaced 200. ELECTRICITY-CIRCUIT MAKERS & BREAKERS.
126
Search Roo contacts in engagement with said stationary contacts, latch means responsive to an overload in said circuit normally holding said tube against sliding motion, and a circuit closing switch controlled by the first interrupting switch for connecting the electrical line through said second interrupting switch when the first interrupting switch has interrupted said circuit, said tube moving longitudinally when said tube moves from operative to inoperative position and being movable laterally when said tube is moved back into operative position.

35. A repeating automatic circuit interrupting switch structure comprising a first interrupting switch and a second interrupting switch, an electrical line normally connected through said first interrupting switch, said interrupting switch having stationary contacts and an arcing tube having spaced contacts, an expulsible conductor electrically connecting said spaced contacts, guiding means slidably holding said tube with the spaced contacts in engagement with said stationary contacts, latch means responsive to an overload in said circuit normally holding said tube against sliding motion, a circuit closing switch controlled by the first interrupting switch for connecting the electrical line through said second interrupting switch when the first interrupting switch has interrupted said circuit, and time delay means controlling the closing of said circuit closing switch, said tube moving longitudinally when said tube moves from operative to inoperative position and being movable laterally when said tube is moved back into operative position.

36. A repeating automatic circuit interrupting switch structure comprising a first interrupting switch and a second interrupting switch, an electrical line normally connected through said first interrupting switch, said first interrupting switch having stationary contacts and an arcing tube having spaced contacts, an expulsible conductor electrically connecting said spaced contacts, a housing enclosing said first interrupting switch and having an open front and bottom, a door on the open front of said housing, guiding means mounted on said door slidably holding said tube with the spaced contacts in engagement with said stationary contacts, latch means responsive to an overload in said circuit normally holding said tube against sliding motion, and a circuit closing switch controlled by the first interrupting switch for connecting the electrical line through said second interrupting switch when the first interrupting switch has interrupted said circuit.

37. A repeating automatic circuit interrupting switch structure comprising a first interrupting switch and a second interrupting switch, an electrical line normally connected through said first interrupting switch, said first interrupting switch having stationary contacts and an arcing tube having spaced contacts, an expulsible conductor electrically connecting said spaced contacts, a housing enclosing said first interrupting switch and having an open front and bottom, a door on the open front of the housing, guiding means mounted on said door slidably holding said tube with the spaced contacts in engagement with said stationary contacts, latch means responsive to an overload in said circuit normally holding said tube against sliding motion, a circuit closing switch controlled by the first interrupting switch for connecting the electrical line through said second interrupting switch when the first interrupting switch has interrupted said circuit, and time delay means controlling the closing of said circuit closing switch, said time delay means delaying the initial closing motion of the closing switch as said closing switch has started to close.

38. A repeating automatic circuit interrupting switch structure comprising a first interrupting switch and a second interrupting switch, an electrical line normally connected through said first interrupting switch, said interrupting switch having stationary contacts and an arcing tube having spaced contacts, an expulsible conductor electrically connecting said spaced contacts, guiding means slidably holding said tube with the spaced contacts in engagement with said stationary contacts, latch means responsive to an overload in said circuit normally holding said tube against sliding motion, a circuit closing switch controlled by the first interrupting switch for connecting the electrical line through said second interrupting switch when the first interrupting switch has interrupted said circuit, said tube moving longitudinally when said tube moves from operative to inoperative position and being movable laterally when said tube is moved back into operative position, and time delay means controlling the closing of said circuit closing switch, said time delay means delaying the initial closing motion of the closing switch as said closing switch has started to close.

39. A repeating automatic circuit interrupting switch comprising a first interrupting switch and a second interrupting switch, an electrical line normally connected through said first interrupting switch, said first interrupting switch including an insulating housing having an open bottom, an arcing tube with an expulsible conductor therein, pivotally mounted means supporting said arcing tube, movable latch means to engage and hold the tube in closed circuit position, means to release the tube from the latch by the bodily movement of said tube through said open bottom, and a circuit closing switch controlled by the first interrupting switch for connecting the electrical circuit through said second interrupting switch.

40. A repeating automatic circuit interrupting switch comprising a first interrupting switch and a second interrupting switch, an electrical line normally connected through said first interrupting switch, said first interrupting switch including an insulating housing having an open bottom, an arcing tube with an expulsible conductor therein, pivotally mounted means supporting said arcing tube, movable latch means to engage and hold the tube in closed circuit position, means to release the tube from the latch by the bodily movement of said tube through said open bottom, a circuit closing switch controlled by the first interrupting switch for connecting the electrical circuit through said second interrupting switch, and time delay means controlling the closing of the circuit closing switch.

41. A repeating automatic circuit interrupting switch structure comprising a first interrupting switch and a second interrupting switch, an electrical line normally connected through said first interrupting switch, said first interrupting switch including an insulating housing having an open bottom, an arcing tube which is movable between closed circuit and open circuit positions, an expulsible conductor within said arcing tube, means to latch the tube in closed circuit position by an approximately lateral motion of the tube, means to release the tube from closed circuit position by the bodily movement of the tube through said open bottom, and a circuit closing switch controlled by the first interrupting switch for connecting the electrical circuit through said second interrupting switch.

42. A repeating automatic circuit interrupting switch structure comprising a first interrupting switch and a second interrupting switch, an electical line normally connected through said first interrupting switch, said interrupting switch having stationary contacts and an arcing tube having spaced contacts, an expulsable conductor electrically connecting said spaced contacts, guiding means slidably holding said tube with the spaced contacts in engagement with said stationary contacts, latch means responsive to an overload in said circuit normally holding said tube against sliding motion, a circuit closing switch controlled by the first interrupting switch for connecting the electrical line through said second interrupting switch when the first interrupting switch has interrupted said circuit, said tube moving longitudinally when said tube moves from operative to inoperative position and being movable laterally when said tube is moved back into operative position, and time delay means controlling the closing of the circuit closing switch.

43. A housed type of cut-out comprising a casing having an open portion, a door for closing the open portion of said casing, a fuse tube, said fuse tube being carried by said door and movable with respect to said door, and a fuse link within said fuse tube restraining said fuse tube from motion with respect to said door, said casing having a pair of stationary contacts and said fuse link normally electrically connecting said contacts, said fuse tube having at least one contact engaging a stationary contact of said casing and movable therefrom when said fuse tube moves with respect to said door upon rupture of said fuse link, said door having a part rigid therewith and constituting an anchor point for said fuse link, the motion of said fuse tube upon rupture of said fuse link causing rapid withdrawal of any remaining unburned portion of the fuse link from said fuse tube.

44. A housed type of cut-out comprising a casing having an open portion, a door for closing the open portion of said casing, a fuse tube, said fuse tube being carried by said door and movable with respect to said door, a fuse link within said fuse tube restraining said fuse tube from motion with respect to said door, said casing having a pair of stationary contacts and said fuse link normally electrically connecting said contacts, said fuse tube having at least one contact engaging a stationary contact of said casing and movable therefrom when said fuse tube moves with respect to said door upon rupture of said fuse link, and means biasing said fuse tube towards motion with respect to said door, said door having a part rigid therewith and constituting an anchor point for said fuse link, the motion of said fuse tube upon rupture of said fuse link causing rapid withdrawal of any remaining unburned portion of the fuse link from said fuse tube.

45. In a drop-out fuse device, in combination, a movable fuse tube disposed to be operatively mounted in an upright position, a terminal member at each end of said fuse tube, latching means controlled by the fusible element of said device and cooperating with the lower portion of said fuse tube for holding it in said upright operative position thereby leaving the upper terminal member of said fuse tube free of retaining means, a spring, and a rotatably mounted contact finger arranged and adapted to be biased into contact engagement with said upper terminal member by said spring.

46. An automatic fuse restoring mechanism comprising, in combination, a pair of fuse devices each having terminal members interconnected by a fusible element and one of said fuse devices being normally connected in an electric circuit, means slidably supporting said fuse devices adjacent the lower portion of said fuse devices, latching means controlled by said fusible elements for holding said fuse devices in operative position in said support means, and switch means arranged and adapted to be operated on movement of said one fuse device from its operative position to shift said circuit to the other fuse device.

47. An automatic fuse restoring mechanism comprising, in combination, a pair of quick action expulsion fuse devices each having spaced contacts interconnected by a fusible element and one of said devices being normally connected in an electric circuit, guide means slidably supporting said fuse devices adjacent the lower portion of said fuse devices, latching means individual to each fuse device and releasable by blowing of the fusible element therein for locking said fuse devices in operative position in said guide means, and transfer switch means arranged and adapted to be operated on movement of said one fuse device from its operative position to shift said circuit to the other fuse device.

48. An automatic fuse restoring mechanism comprising, in combination, a pair of quick action expulsion fuse devices mounted in an upright position, upper and lower terminal members on each fuse device adapted to be interconnected by a fusible element, circuit means normally connecting one of said fuse devices in an electric circuit at its upper terminal member while the other fuse device is disconnected therefrom at its upper terminal member, a sleeve individual to each fuse device for slidably supporting it therein, latching means individual to each fuse device for locking them in operative position in said sleeves and permitting downward movement through said sleeves on blowing of the fusible elements therein, and transfer switch means arranged and adapted to be operated on movement of said one fuse device from its operative position to shift said circuit to the other fuse device, said one fuse device in operated position being disconnected from said circuit means at its upper terminal member and said other fuse device being connected thereto at its upper terminal member.

49. An automatic fuse restoring mechanism comprising, in combination, a pair of fuse devices each having terminal members interconnected by a fusible element and one of said fuse devices being normally connected in an electric circuit, means slidably supporting said fuse devices adjacent the lower portion of said fuse devices, latching means controlled by said fusible elements for holding said fuse devices in operative position in said support means, resilient means biasing said fuse devices for movement relative to the support means and restrained by said latching means, and switch means arranged and adapted to be operated on movement of said one fuse device from its operative position to shift said circuit to the other fuse device.

50. An automatic fuse restoring mechanism comprising, in combination, a pair of quick action expulsion fuse devices each having spaced contacts interconnected by a fusible element and one 200. ELECTRICITY: CIRCUIT MAKERS & BREAKERS
Search Ro of said devices being normally connected in an electric circuit, guide means slidably supporting said fuse devices adjacent the lower portion of said fuse devices, latching means individual to each fuse device and releasable by blowing of the fusible element therein for locking said fuse devices in operative position in said guide means, spring means tending to release said latching means, transfer switch means arranged and adapted to be operated on movement of said one fuse device from its operative position to shift said circuit to the other fuse device, and additional spring means restrained by said one fuse device as long as it remains in its operative position for biasing said transfer switch to its operated position.

51. An automatic fuse restoring mechanism comprising, in combination, a pair of quick action expulsion fuse devices mounted in an upright position, upper and lower terminal members on each fuse device adapted to be interconnected by a fusible element, circuit means normally connecting one of said fuse devices in an electric circuit at its upper terminal member while the other fuse device is disconnected therefrom at its upper terminal member, a sleeve individual to each fuse device for slidably supporting it therein adjacent the lower portion of the device, latching means individual to each fuse device for locking them in operative position in said sleeves and permitting downward movement through said sleeves on blowing of the fusible elements therein, spring means tending to release said latching means by biasing said fuse devices axially downwardly through said sleeves, transfer switch means arranged and adapted to be operated on movement of said one fuse device from its operative position to shift said circuit to the other fuse device, and additional spring means restrained by said one fuse device as long as it remains in its operative position for biasing said transfer switch to its operative position, said one fuse device in operated position being disconnected from said circuit means at its upper terminal member and said other fuse device being connected thereto at its upper terminal member.

52. In combination, a sleeve member constituting a terminal, a fuse tube slidable in said sleeve member, a second terminal at one end of said fuse tube, said fuse tube being provided with an axial bore for positioning a fusible element therein to interconnect said terminals, a lever rotatably mounted on said sleeve member about an axis remote from the other end of said fuse tube and restrained from rotation by said fusible element, spring means biasing said fuse tube for movement relative to said sleeve member, and operating means movable with said fuse tube and engaging said lever close to its axis of rotation and remote from said other end of said fuse tube.

53. In a fuse device, in combination, a housing, a fuse tube having an axial bore for a fusible element one end of which is open, said fuse tube being slidably mounted adjacent its open end in said housing, spring means biasing said fuse tube for movement relative to said housing, a lever controlled by said fusible element and opposing the action of said spring means, said lever being rotatably mounted on said housing remote from the open end of said fuse tube, and an operating arm carried by said fuse tube and engaging said lever near its axis of rotation and remote from the open end of said fuse tube.

54. In a fuse device, in combination, a housing, a fuse tube having an axial bore for a fusible element one end of which is open, said fuse tube being slidably mounted adjacent its open end in said housing, spring means biasing said fuse tube for movement relative to said housing, a lever rotatably mounted at one end on said housing, the other end of said lever being positioned adjacent the open end of said fuse tube, a flexible conductor connected to said fusible element and extending over said other end of said lever for holding it against the action of said spring means, and detent means carried by said fuse tube and engaging said lever near its axis of rotation and remote from said open end of said fuse tube.

WILLIAM O. SCHULTZ.
ALWIN G. STEINMAYER.